Figure 1:
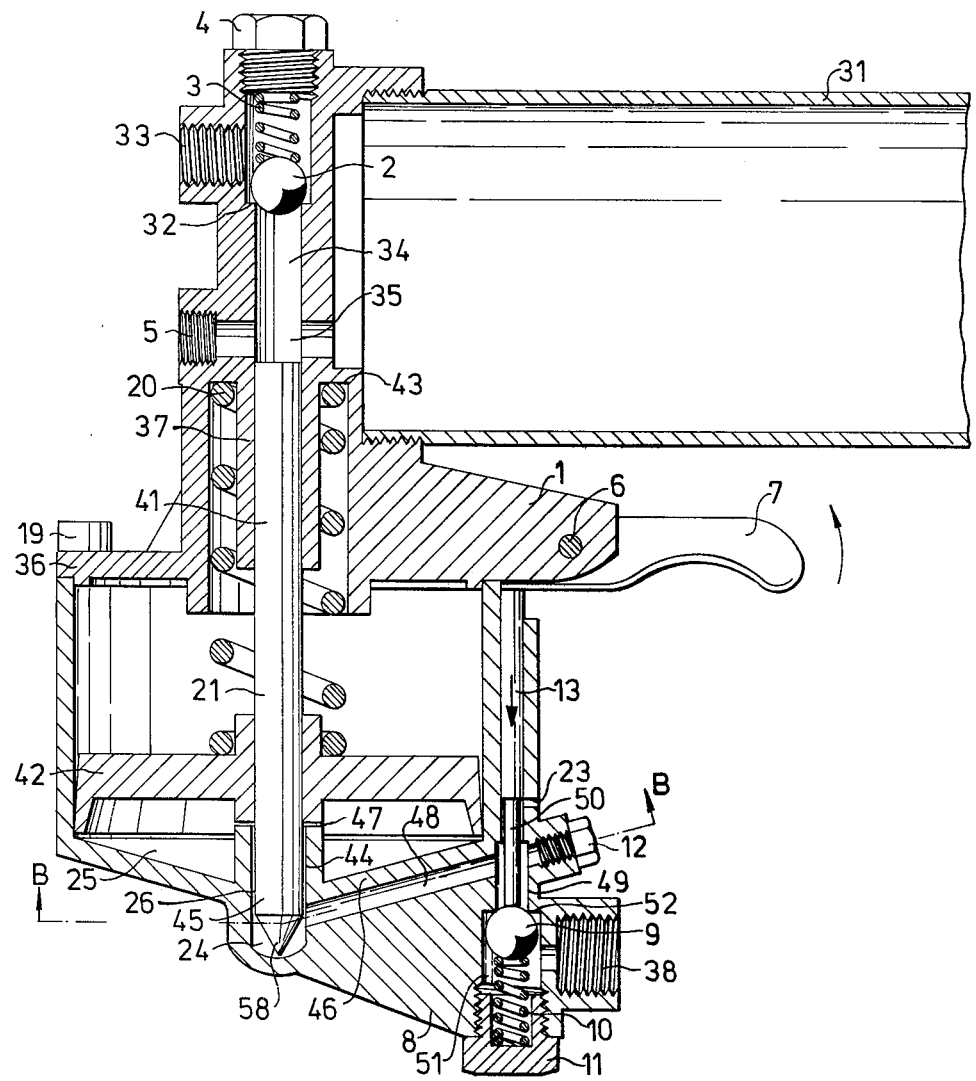

United States Patent [19]

Andersson

[11] 4,274,561
[45] Jun. 23, 1981

[54] DISPENSER PREFERABLY DRIVEN BY COMPRESSED-AIR FOR CONTINUOUSLY DISPENSING A SUBSTANCE FROM A CONTAINER, AND IN PARTICULAR A VISCOUS OR PASTE-LIKE MATERIAL

[76] Inventor: Morgan Andersson, OPE 2760, 831 00 Östersund, Sweden

[21] Appl. No.: 79,223

[22] Filed: Sep. 26, 1979

[30] Foreign Application Priority Data

Oct. 6, 1978 [SE] Sweden ............................... 7810482

[51] Int. Cl.³ ............................................ G01F 11/00
[52] U.S. Cl. ............................ 222/334; 222/372; 417/401; 91/290; 91/303; 91/454
[58] Field of Search ................... 417/401; 91/268, 290, 91/303, 454; 222/258, 261, 262, 334, 372, 389, 504

[56] References Cited

U.S. PATENT DOCUMENTS

| | | | |
|---|---|---|---|
| 1,939,943 | 12/1933 | Bates | 222/334 |
| 2,100,092 | 11/1937 | Tear | 417/401 |
| 3,963,383 | 6/1976 | Hill | 417/401 |

Primary Examiner—H. Grant Skaggs
Attorney, Agent, or Firm—Hammond & Littell, Weissenberger and Muserlian

[57] ABSTRACT

A compressed-air operated dispenser for continuously dispensing a substance enclosed in a container, and in particular a viscous or paste-like substance, comprising an outlet passage extending from container to an outlet; a valve which normally closes the passage; a compressed-air operated piston arranged to exert pressure on a substance in the passage and to open the valve; and a trigger means for initiating the supply of compressed air for the purpose of operating said piston.

In accordance with the invention there is provided a second valve arranged to move the piston to a starting position in which a pressure-actuating chamber is closed on one side of the piston with the exception of a passage through which compressed air can be forced into the chamber to cause the piston to move to a first terminal position. In this position the substance is subjected to pressure and the valve is opened and the piston ceases to act on the second valve. An air-return passage is opened to cause the second valve to be moved to a second position, in which an exhaust hole for compressed air in said chamber is placed in communication with atmosphere and the piston returns to a second terminal position in which it causes the second valve to return to its starting position.

5 Claims, 3 Drawing Figures

Fig_1

DISPENSER PREFERABLY DRIVEN BY COMPRESSED-AIR FOR CONTINUOUSLY DISPENSING A SUBSTANCE FROM A CONTAINER, AND IN PARTICULAR A VISCOUS OR PASTE-LIKE MATERIAL

The present invention relates to a dispenser preferably driven by compressed-air for continuously dispensing a substance from a container, and in particular a viscous or paste-like substance, said dispenser including an outlet passage extending from said container to an outlet; a valve which normally closes said passage; a plunger which is actuated by compressed air and which is arranged to bring pressure to bear on the substance in said passage and to open said valve; and an operating means for initiating the supply of compressed air for operating the piston.

Dispensers or pumps of the aforedescribed kind are known to the art, said dispensers being arranged to dispense given quantities of said substance by actuating the operating means in a manner such that the requisite amount of compressed air is fed to the dispenser. Before a further quantity can be dispensed, the operating means must be permitted to return to a starting position, where it is again reactivated such as to cause a further quantity of said substance to be dispensed.

It will readily be understood that there is a clear need for a dispenser or pump which will operate continuously, i.e. in which the piston will move backwards and forwards all the time the operating means is held depressed.

This is achieved in accordance with the invention by the fact that a valve means actuated by the piston is arranged to be moved to a starting position by said piston or by an overpressure in a first chamber, in which starting position a further pressure-actuating chamber on one side of the piston head is closed to an extent such as to leave a narrow restriction passage encircling the end of the piston between the first and the second chambers, to permit compressed air to penetrate to said second chamber in order to move the piston to a first limit position of movement, in which position the said substance is subjected to pressure and said valve is opened, and in which the effect of the piston on said valve means ceases and an air-return passage is opened such as to move the valve means to a second position opposite to said first, in which second position an exhaust hole for compressed-air in said second chamber is opened to atmosphere and the piston returns to a second limit position of movement, said passage being so narrow that the valve means can be returned to its starting position by said compressed air before the pressure in the second chamber becomes the same as that in the first chamber upon subsequent movement of the piston to the first position.

A dispenser constructed in the aforedescribed manner can be manufactured cheaply and can be adapted to different requirements by changing the dimensions of the passage accordingly. An exemplary embodiment of the invention will now be described in more detail with reference to the accompanying schematic drawing, in which FIG. 1 is a vertical sectional view of the novel dispenser FIG. 2 is a sectional view taken on the line B—B in FIG. 1, and FIG. 3 is a sectional view taken on the line C—C of FIG. 2.

The pump or dispenser according to the invention comprises two main parts, namely a pump unit 1 and a cylinder unit 8 connected thereto, said units being sealingly connected together by screwing a lower lid part 36 of the unit 1 against the upper part of the unit 8 by means of screws 19. Screwed onto the pump unit 1 is a storage tube 31 in which the material or substance to be dispensed, e.g. grease, is fed forwards by means of a spring means which includes a piston and piston rod not shown. Grease can be introduced into the storage tube 31 through a filling hole 5 via a connecting nipple (not shown) screwed therein, said filling hole 5 communicating with the tube 31 through a bore 35. A vacuum chamber 34 extending from said tube connects the tube with a grease-feeding hole 33 to which a hose can be fitted via a nipple (not shown) screwed into said hole. A valve unit is screwed into the upper part of the unit 1 by means of a nut 4, said valve unit comprising a ball 2 which is biassed by means of a spring 3 against a seating 32 at the upper end of the chamber 34, thereby to close the passage from the tube 31 to the outlet 33 in the inactive position of the dispenser. The piston stem 41 of a piston 21 is guided in a cylindrical part 37 of the unit 1. Arranged around the piston stem 41 is a pressure spring 20 which is active between the piston head 42 of the piston 21 and the bottom 43 to bias the same to the upper end of the cylindrical parts 47. The piston head 42 is arranged for movement in a cylindrical part 44 of the unit 8. The piston stem 41 is fixedly connected to the head 42 and passes therethrough to form a piston end 45 at the lower part of the piston 21.

In FIG. 1, the piston end 45 is shown in its lower terminal position, inserted in a bore 44 with a clearance around the wall thereof such as to form a peripheral passage 26. In this position there is formed between the chamber 24 (designated the first chamber) of the bore 44 a narrow passage 47 which is defined between a bottom part of the unit 8 and the piston end 45, and a chamber 25 (designated the second chamber) between a bottom part 46 of the unit 8 and the underside of the piston head 42. The bore 44, i.e. the first chamber 24, is connected, through a passage 48, with a vertical bore 49, transverse a said passage 48, and is outwardly closed by a screw plug 12. Slidably arranged in the bore 49 is a valve rod 13 (which when activated is moved in the direction of the arrow) having a lower part 50 of reduced diameter. The valve rod 13 is activated by means of a trigger unit 7 (which when activated is moved counter clockwise in the direction of the arrow) pivotally connected at 6 to the unit 1. A ventilating hole 23 connects the bore 49 with atmosphere in the illustrated position of the rod 13. The bore 49 is widened at the bottom thereof to form a valve chamber 51 in which there is arranged a ball 9 which is urged upwardly towards a seating 52 in the transition region of the chamber 51 and the narrower part of the bore 49, by a spring 10, the bottom end of which spring rests against a screw plug 11 screwed into the unit 1. The chamber 51 communicates with a compressed-air inlet 38.

Figure 2:
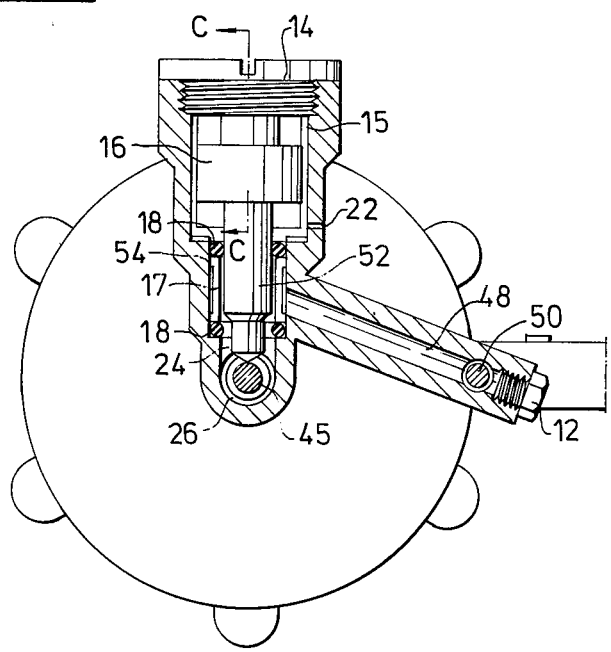
Figure 3:
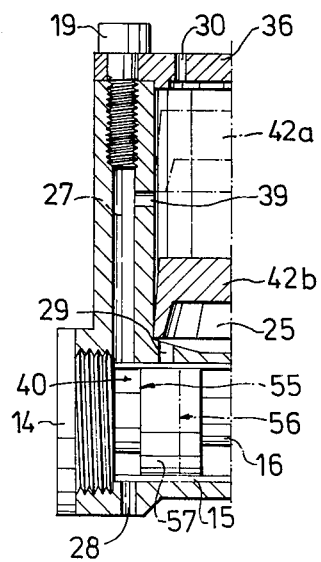

FIG. 2 is a sectional view taken on the line B—B in FIG. 1. A screw 14 is screwed into a bore forming a valve cylinder 15 in the unit 8. A valve piston 16 is illustrated in its first terminal position resting against the underpart of the screw 14. The rod part 52 of the valve piston is arranged to slide in a bore 54, the ends of said bore being sealed by an upper and a lower sealing ring 18 while the clearance between said ends is sealed by a seal 17. In the illustrated terminal position, the upper sealing ring effectively seals against the rod part 52, but not the lower sealing ring. The reference 22 identifies a ventilating hole.

FIG. 3 is a sectional view taken on the line C—C in FIG. 2. The arrow 55 illustrates the valve piston 16 in its first terminal position abutting the screw 14. The arrow 56 illustrates the valve piston 16 in its other, right-hand terminal position. In this latter position there is formed in the bore 15 between the screw 14 and the valve piston 16 a space 57 which communicates with atmosphere through a hole 28 and which communicates with the chamber 25 beneath the piston head 42 through a ventilating hole 29. The piston head 42 is illustrated in its upward terminal position at 42a and in its lower terminal position at 42b. The space 57 also communicates with the opposite side of the piston head through an air hole 40, an air passage 27 and an air hole 39, when said piston head is in the position 42b, but with the underside of said piston head when in position 42a. A ventilating hole 30 in the lid part 36 is constantly open and serves as a passage for input air and output air in front of the piston 42.

In FIG. 1 the space through-passed by compressed air in the given positions of the said elements comprises: the inlet 38, the chamber 51, the passage 48, the chamber 24 and the passages 26, 47. In the FIG. 2 embodiment this space comprises: the passage 48, the space 24 and the clearance between the parts 54 (17) and 52. In the FIG. 3 embodiment the return air passes from the hole 39 in the passage 27, through the hole 40, into the space 57 and to the hole 28 and, in the upper position of the piston head, through the outlet 30 and, in FIG. 1, to the outlet 23.

A working stroke of the dispenser, or grease gun, according to the invention will now be briefly described: In the starting position of the grease gun, the piston 21 will always lie in its starting position shown in FIG. 1, because the spring 20 urges the piston downwardly. The lower end of the piston 21 is tapered conically at 58 so that it is able to urge the valve 16 to its position 55 shown in FIG. 3 (and FIG. 2). With the trigger means 7 in its non-activated position, no air cushion will be present in the second chamber 25, since the gun is completely evacuated of pressurized air through the return hole 23. When the trigger means 7 is pressed, the pressure rod 13 is moved to close the hole 23 and to urge the ball 9 to its open position, wherewith compressed air is released to the first chamber 24. The purpose of the air pressure in the first chamber is to urge the valve 16 to its position 55 (in FIG. 2 upwardly). This is achieved through the passage 26, which restricts the flow of air for a period of time sufficient to enable the valve in question to reach said position before the second chamber 25 has been filled to the same pressure. In effect there is formed an air cushion in the second chamber 25 when the point of the valve mechanically closes the ventilating hole 29. The valve will then remain in an intermediate position, and consequently the overpressure in the first chamber is necessary to move the valve to the position 55. When the air passes through the passage 26, a pressure is built up in the second chamber 25, wherewith the piston 42 is urged upwardly to its uppermost position 42a, where the passage 27 is filled with compressed air through the outlet hole 29. This air urges the valve 16 to its position 56, and the hole 29 for return air is therewith opened. The surface on the left side of the valve is greater than that of the opposite side thereof, and hence the valve 16 will be pressed over by the air pressure. The ventilation hole 29 is so positioned that ventilation takes place from the time that air is introduced into the passage 27. This prevents the valve stopping in an intermediate position, and causes the valve to stop in its upper position. The pressure on the grease in chamber 34 is increased by the piston 21 in its upper position, such that the valve ball 2 is lifted from its seating 32 and grease can be discharged through the outlet 33. When the pressure on the trigger means 7 is released, the valve rod 13 will return to the position illustrated in FIG. 1 and the ventilating hole 23 opened, so that pressure in the chambers 24 and 25 is relieved, whereupon the piston 21 will return to the position illustrated in FIG. 1. The valve piston 16 is then urged by the piston point 58 to position 55 (i.e. the position illustrated in FIG. 2). The grease gun or dispenser can then be re-activated by pressing the trigger means 7. It will be understood that if the trigger means is held in its pressed position, the dispenser will operate by pumping continuously.

I claim:

1. A compressed-air operated dispenser for continuously dispensing a substance enclosed in a container, particularly a viscous or paste like substance, said dispenser comprising a substance outlet-passage extending from said container to an outlet; a first valve normally closing said substance outlet-passage; a piston which is moved reciprocally by compressed air and which is arranged to exert pressure on the substance in said substance-outlet passage and to open said first valve; trigger means for initiating the supply of compressed air in order to operate said piston; a second valve arranged to be moved by said piston and by an overpressure in a first chamber to a starting position, in which position a second pressure chamber on one side of the head of said piston is closed with the exception of a constriction passage around the end of said piston between said first and said second chambers for passing compressed air into said second chamber for moving the piston to a first movement end piston in which position said substance is pressurized and said first valve is opened and in which said piston ceases to act on said second valve, and an air-return passage is opened to move said second valve to a second, opposite position in which an exhaust hole for compressed air in said second chamber is opened to the atmosphere and the piston returns to a second end position, said constriction passage being so narrow that the second valve is moved to its starting position by the compressed air before the air pressure in the second chamber becomes the same as that in the first chamber upon the subsequent movement of the piston to its first end position, said trigger means being arranged to open a third valve in the feed path for compressed air in order to supply compressed air to said first chamber which is defined by a first surface of the piston and is connected over said constriction passage to the second chamber which is defined by a second, larger surface of the piston, said second surface when pressure-actuated being arranged to move the piston in the same direction as when pressure acts on said first surface.

2. A dispenser according to claim 1, wherein at the opposite end of said second chamber there is provided a space which is arranged to be evacuated to atmosphere upon movement of the piston to its first end position.

3. A dispenser according to claim 1, wherein said piston comprises a stem part acting upon said substance;

a main part having a larger diameter than said stem part and a piston end on the opposite side of the main part relative to said stem part; and a coil spring arranged to urge the piston to its second end position.

4. A dispenser according to claim 3, wherein said piston end is terminated with a conical point acting upon said second valve.

5. A dispenser according to claim 1, wherein said trigger means is arranged to act upon a valve stem which, in an active position, closes a ventilating hole normally communicating with a part of the feed path for compressed air.

* * * * *